United States Patent
Nie et al.

(10) Patent No.: US 10,491,795 B2
(45) Date of Patent: Nov. 26, 2019

(54) AUXILIARY PORTABLE PHOTOGRAPHING DEVICE FOR USE IN A MOBILE PHONE AND IMAGE DATA COLLECTION METHOD

(71) Applicant: SOOCHOW UNIVERSITY, Suzhou (CN)

(72) Inventors: Jihua Nie, Suzhou (CN); Qi Zhang, Suzhou (CN); Xing Tong, Suzhou (CN); Ruigong Su, Suzhou (CN); Jianping Cao, Suzhou (CN); Yuyou Qiu, Suzhou (CN); Jian Tong, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 15 days.

(21) Appl. No.: 16/061,384

(22) PCT Filed: Jun. 7, 2017

(86) PCT No.: PCT/CN2017/087480
§ 371 (c)(1),
(2) Date: Jun. 12, 2018

(87) PCT Pub. No.: WO2018/024026
PCT Pub. Date: Feb. 8, 2018

(65) Prior Publication Data
US 2018/0367723 A1    Dec. 20, 2018

(30) Foreign Application Priority Data

Aug. 4, 2016 (CN) .......................... 2016 1 0633467
Aug. 4, 2016 (CN) .......................... 2016 1 0633574
Aug. 4, 2016 (CN) ..................... 2016 2 0838988 U (51) Int. Cl.
*H04N 5/232* (2006.01)
*H04N 5/235* (2006.01)
(Continued)

(52) U.S. Cl.
CPC .... *H04N 5/23203* (2013.01); *H04M 1/72527* (2013.01); *H04N 5/2251* (2013.01);
(Continued)

(58) Field of Classification Search
CPC .......... H04N 5/23203; H04N 5/22541; H04N 5/2257; H04N 5/2251; H04N 5/23209;
(Continued)

(56) References Cited

U.S. PATENT DOCUMENTS

2006/0013577 A1* 1/2006 Uemura ................ G03B 17/00
                                                    396/79

FOREIGN PATENT DOCUMENTS

CN      2706981 Y    6/2005
CN      1750554 A    3/2006
(Continued)

*Primary Examiner* — Padma Haliyur
(74) *Attorney, Agent, or Firm* — SZDC Law P.C.

(57) ABSTRACT

An auxiliary portable photographing device for use in a mobile phone includes an image collection module, a data transmission module and a second power module; the image collection module includes a lens optical unit, an imaging unit and a collection controller connected together; the lens optical unit adopts a lens system of a multistage barrel; the imaging unit adopts a CMOS system; the data transmission module includes an AD converter, a register and a transmission controller connected together; the interface is detachably connected with the connector to achieve detachable connection. The image data collection method performs photographing by the lens optical unit and imaging unit, and the picture photographed is transmitted to the mobile phone to be processed, optimized and displayed. The photographing device is light and portable as compared to conventional portable cameras, and provides better image data as compared to cameras built in the mobile phones.

17 Claims, 3 Drawing Sheets

(51) Int. Cl.
*H04N 5/225* (2006.01)
*H04M 1/725* (2006.01)
*H04M 1/02* (2006.01)

(52) U.S. Cl.
CPC ......... *H04N 5/2254* (2013.01); *H04N 5/2257* (2013.01); *H04N 5/22541* (2018.08); *H04N 5/2353* (2013.01); *H04N 5/23209* (2013.01); *H04N 5/23212* (2013.01); *H04N 5/23216* (2013.01); *H04N 5/23229* (2013.01); *H04N 5/23296* (2013.01); *H04N 5/232411* (2018.08); *H04M 1/0264* (2013.01); *H04N 5/23293* (2013.01)

(58) Field of Classification Search
CPC ............. H04N 5/2254; H04N 5/23296; H04N 5/232411; H04N 5/23216; H04N 5/23212; H04N 5/2353; H04N 5/23229; H04N 5/23293; H04M 1/72527; H04M 1/0264
See application file for complete search history.

(56) References Cited

FOREIGN PATENT DOCUMENTS

| | | |
|---|---|---|
| CN | 103501371 A | 1/2014 |
| CN | 106101508 A | 11/2016 |
| CN | 106101560 A | 11/2016 |
| CN | 205945938 U | 2/2017 |
| CN | 205945968 U | 2/2017 |
| CN | 205945969 U | 2/2017 |
| TW | 201503681 A | 1/2015 |

\* cited by examiner

AUXILIARY PORTABLE PHOTOGRAPHING DEVICE FOR USE IN A MOBILE PHONE AND IMAGE DATA COLLECTION METHOD

CROSS-REFERENCE TO RELATED APPLICATIONS

This application is the national phase application of PCT/CN2017/087480, filed on Jun. 7, 2017, which claims priority to three Chinese Patent Applications, i.e., a Chinese Patent Application No. CN201610633467.9 filed on Aug. 4, 2016 in Chinese Patent Office and tiled AN AUXILIARY PORTABLE PHOTOGRAPHING DEVICE OF A SIMPLIFIED STRUCTURE FOR USE IN A MOBILE PHONE; a Chinese Patent Application No. CN201610633574.1 filed on Aug. 4, 2016 in Chinese Patent Office and tiled AN AUXILIARY PORTABLE PHOTOGRAPHING DEVICE EASY TO BE CONNECTED FOR USE IN A MOBILE PHONE; and a Chinese Patent Application No. CN201620838988.3 filed on Aug. 4, 2016 in Chinese Patent Office and tiled AN AUXILIARY PORTABLE PHOTOGRAPHING DEVICE OF A RETRACTABLE BARREL FOR USE IN A MOBILE PHONE, and the entire content of all these three patent applications is incorporated herein by reference.

FIELD OF THE INVENTION

The present disclosure generally relates to the field of photographing devices, and more particularly, relates to an auxiliary portable photographing device for use in a mobile phone and an image data collection method.

BACKGROUND OF THE INVENTION

With the continuous development of the technology of mobile phones, most of smart phones currently available have the function of photographing, and the hardware configuration thereof for photographing is increasingly high. However, due to limitations of the volume of the mobile phones, the smart phones currently available cannot reach the photographing level of professional cameras.

Current professional cameras, e.g., home cameras, single lens reflex cameras and mirrorless cameras, are generally provided with a body, an image collection module, an AD conversion module, a data storage module, a data transmission module, a data processing module and an image display module or the like, and the volume and weight thereof are relatively large, so they are not convenient to be carried.

SUMMARY OF THE INVENTION

To solve the aforesaid technical problems, an objective of the present disclosure is to provide an auxiliary portable photographing device for use in a mobile phone and an image data collection method, which simplify the data storage and the processing system so that the photographing device is lighter and more portable as compared to conventional portable cameras, and provide more excellent image data for the mobile phone as compared to cameras built in the mobile phones.

To achieve the aforesaid objective of the present disclosure, the present disclosure provides the following technical solutions: an auxiliary portable photographing device for use in a mobile phone is provided, the mobile phone comprises a first body, a data storage module, a data processing module, an image display module and a first power module, the first body is provided with an interface configured for signal transmission and power supplying, the portable photographing device comprises a second body, an image collection module, a data transmission module, and a second power module, the second body is provided with a connector configured for signal transmission and power supplying, the image collection module comprises a lens optical unit, an imaging unit and a collection controller connected together, the lens optical unit adopts a lens system of a multistage barrel, the imaging unit adopts a CMOS system, the data transmission module comprises an AD converter, a register and a transmission controller connected together, the interface is detachably connected with the connector to achieve detachable connection between the register and the data storage module as well as the detachable connection between the first power module and the second power module.

In the aforesaid technical solution, the interface and the connector form a USB connection structure, which preferably is a Micro-USB connection structure.

In the aforesaid technical solution, the lens system adopts a three-stage barrel, and a focal length of the lens of the lens system ranges from 5.4 mm to 30 mm, and preferably from 8 mm to 24 mm.

In the aforesaid technical solution, an imaging size of the CMOS system ranges from 1 inch to $1/10$ inches, and preferably is 1/4.6 inches.

In the aforesaid technical solution, the collection controller is mainly constituted by a shutter adjusting system, an auto-focusing system, an aperture adjusting system and a focal-length adjusting system.

In the aforesaid technical solution, a shutter button and zoom keys are disposed on the second body, the shutter adjusting system is controlled by the shutter button disposed on the second body, the auto-focusing system is controlled by software of the first body or controlled by the shutter button disposed on the second body, a focusing instruction is issued by half pressing the shutter button, a photographing instruction is issued by full pressing the shutter button, the aperture adjusting system and the focus-length adjusting system are controlled by the software of the first body or controlled by the zoom keys disposed on the second body, an enlargement key of the zoom keys is adjusted to enlarge the focal length and a reduction key of the zoom keys is adjusted to reduce the focal length respectively in a focal-length adjusting mode, and the enlargement key of the zoom keys is adjusted to enlarge the aperture and the reduction key of the zoom keys is adjusted to reduce the aperture respectively in an aperture adjusting mode.

In the aforesaid technical solution, a photographing instruction is issued via a touch screen of the first body or a photographing instruction is issued via the shutter button of the second body, the photographing instruction issued by the first body is transmitted, through the USB connection structure formed by the interface and the connector, to the image collection module of the second body to accomplish data collection via the image collection module of the second body, and then the collected data is transmitted back to the data storage module of the first body; the photographing instruction issued by the shutter button of the second body is transmitted to the image collection module of the second body by the shutter adjusting system of the second body to accomplish data collection via the image collection module of the second body, and then the collected data is transmitted back to the data storage module of the first body.

In the aforesaid technical solution, a focusing instruction and a zooming instruction are issued respectively via the shutter button and the zoom keys of the second body and transmitted to the lens optical unit and the imaging unit of the second body by the collection controller of the second body to accomplish focusing and zooming, and real-time image data is fed back to the image display module of the first body.

In the aforesaid technical solution, after the first body and the second body are connected together, the instruction issued by the first body has a higher priority, the instruction issued by the first body is adopted by default when the first body and the second body issue the instructions at the same time; after the first body and the second body are connected together, the lens optical unit and the imaging unit of the second body have a higher priority, an image collected by the second body is adopted by default when the first body and the second body collect images at the same time; after the first body and the second body are connected together, if the lens optical unit and the imaging unit of the second body are turned off and the first body issues an instruction, then the image collected by the first body is adopted; after the first body is separated from the second body, if the second body issues an instruction, then the image collected by the second body is adopted and temporarily stored in the register.

In the aforesaid technical solution, the second power module comprises a supercapacitor, and when the second power module is equipment with a lithium battery, the supercapacitor is powered by the lithium battery, and the lithium battery charges the first power module when no photographing is performed; and when the second power module is not provided with the lithium battery, the supercapacitor is powered by the first power module.

An embodiment of the present disclosure further provides an auxiliary portable photographing device for use in a mobile phone, the mobile phone comprises a first body, a data storage module, a data processing module, an image display module and a first power module, the first body is provided with an interface configured for signal transmission and power supplying, the portable photographing device is formed by a second body, an image collection module, a data transmission module, and a second power module, the second body is provided with a connector configured for signal transmission and power supplying and a latch groove for detachably connected to the first body, one end of the latch groove communicates with an end face of the second body to form an insert port of the first body, the connector is disposed at the other end of the latch groove to achieve detachable connection with the interface, the interface is detachably connected with the connector to achieve detachable connection between the data transmission module and the data storage module as well as the detachable connection between the first power module and the second power module.

In the aforesaid technical solution, a slide groove is disposed at the other end of the latch groove, the connector is slidably connected and limited in the slide groove, and the connector is capable of being withdrawn to the slide groove or being extended to the latch groove outside the slide groove.

In the aforesaid technical solution, an elastic redundancy is set for the second body, the second body closely fits with the latch groove, and an pressure imposed by the second body on the first body is lower than 2 MPa.

In the aforesaid technical solution, the latch groove and the slide groove have a generally C-shaped cross section.

In the aforesaid technical solution, the thickness of a right-end hand-held portion of the second body is 2 to 3 times of the thickness of the left end thereof, and a gradually varied arc structure is formed between the right end of the second body and a position at ⅓ to the right end.

An embodiment of the present disclosure further provides another auxiliary portable photographing device for use in a mobile phone, the mobile phone comprises a first body, a data storage module, a data processing module, an image display module and a first power module, the first body is provided with an interface configured for signal transmission and power supplying, the auxiliary portable photographing device for use in a mobile phone is formed by a second body, an image collection module, a data transmission module, and a second power module, the second body is provided with a connector configured for signal transmission and power supplying and a receiving groove configured for mounting the image collection module, the image collection module comprises a lens optical unit, an imaging unit and a collection controller, the lens optical unit comprises a step motor and a multistage barrel, a barrel wall of the multistage barrel is moveably connected with multiple screws along the direction of an optical axis via a nut bearing component, and among the multiple screws, one screw is drivingly connected on a driving shaft of the step motor, and the other screws are drivingly connected on a rotating shaft of the barrel, an opening of the receiving groove is provided with a baffle, the baffle is movably connected on a pinion via a rack in the direction perpendicular to the optical axis, the pinion is drivingly connected on a rotating shaft of the baffle, the driving shaft of the step motor, the rotating shaft of the barrel and the rotating shaft of the baffle are drivingly connected via a pinion, the interface is detachably connected with the connector to achieve detachable connection between the data transmission module and the data storage module as well as the detachable connection between the first power module and the second power module.

In the aforesaid technical solution, a pinion disposed on the driving shaft of the step motor, a pinion disposed on the rotating shaft of the barrel and the pinion disposed on the rotating shaft of the baffle achieve the movement of the baffle as well as the adjustment of the expansion and retraction speed of the barrel through different transmission ratios, and the energy required by the operation of the step motor is provided by the second power module.

An embodiment of the present disclosure further provides another auxiliary portable photographing device for use in a mobile phone, the mobile phone comprises a first body, a data storage module, a data processing module, an image display module and a first power module, the first body is provided with an interface configured for signal transmission and power supplying, the auxiliary portable photographing device for use in a mobile phone is formed by a second body, an image collection module, a data transmission module, and a second power module, the second body is provided with a connector configured for signal transmission and power supplying, the image collection module comprises a lens optical unit, an imaging unit and a collection controller, the lens optical unit comprises a step motor and a multistage barrel, a barrel wall of the multistage barrel is moveably connected with multiple screws along the direction of an optical axis via a nut bearing component, and among the multiple screws, one screw is drivingly connected on a driving shaft of the step motor, and the other screws are drivingly connected on a rotating shaft of the barrel, the interface is detachably connected with the connector to achieve detachable connection between the data transmission module and the data storage module as well as the detachable connection between the first power module and the second power module.

In the aforesaid technical solution, the second body is further provided with a receiving groove configured for mounting the image collection module, an opening of the receiving groove is provided with a baffle, the baffle is movably connected on a pinion via a rack in the direction perpendicular to the optical axis, the pinion is drivingly connected on a rotating shaft of the baffle, and the driving shaft of the step motor, the rotating shaft of the barrel and the rotating shaft of the baffle are drivingly connected via a pinion.

An embodiment of the present disclosure further provides an image data collection method applicable to the auxiliary portable photographing device for use in a mobile phone described above, and the image data collection method comprises:

connecting an interface with a connector to achieve signal and electrical connection between the mobile phone and the portable photographing device;

issuing an instruction by the mobile phone to control a lens optical unit and an imaging unit of the portable photographing device to perform image data collection;

performing analog-digital conversion by an AD converter on the collected image data and storing the converted image data into a register, and then transmitting the image data into a data storage module; and processing and optimizing the image data in the data storage module by a data processing module of the mobile phone, and displaying the image data on the image display module of the mobile phone.

In the aforesaid technical solution, the method further comprises:

a first body having a higher priority, and adopting an instruction issued by the first body by default when the first body and the second body issue instructions at the same time; and the lens optical unit and the imaging unit of the second body having a higher priority, and adopting an image collected by the second body by default when the first body and the second body collect images at the same time.

By using the aforesaid technical solution, the present disclosure has the following advantages as compared to the prior art:

1. for the auxiliary portable photographing device for use in a mobile phone and the image data collection method disclosed in the present disclosure, after the portable photographing device is connected with the mobile phone, data storage, processing and displaying are accomplished by the storage system, processing system and the displaying system of the mobile phone, and the optimizing and the displaying of the image are accomplished by the software of the mobile phone, which simplifies the data storage and processing system so that the portable photographing device is lighter and more portable as compared to the conventional portable cameras. Moreover, the auxiliary portable photographing device for use in a mobile phone and the image data collection method provide more excellent image data as compared to the camera built in the mobile phone, the portable photographing device generates digital image information, the digital image information is stored on the mobile phone via a transmission system, the data is processed and optimized by the mobile phone and meanwhile disposed on a display of the mobile phone to be further shared to other objects by the software; and meanwhile, collecting, processing, optimizing and sharing functions for the information of pictures of high quality are accomplished simultaneously.

2. the auxiliary portable photographing device for use in a mobile phone and the image data collection method disclosed in the present disclosure may achieve upgrading of the mobile phone and the upgrading of the second body respectively. By replacing with a first body of a new mobile phone or replacing with a second body of a new portable photographing device, more rapid data processing and optimizing of data and data sharing are achieved, and this not only can provide more excellent image quality, but also can effectively reduce the economical burden of the user.

3. by providing the latch groove and the slide groove, the auxiliary portable photographing device for use in a mobile phone and the image data collection method disclosed in the present disclosure achieve stable connection of the mobile phone, and meanwhile protect the connector.

4. by providing the second power module, the auxiliary portable photographing device for use in a mobile phone and the image data collection method disclosed in the present disclosure may better achieve the function of flash exposure, thereby obtaining more excellent images under strong light or weak light.

5. by the image collection module of the second body, the auxiliary portable photographing device for use in a mobile phone and the image data collection method disclosed in the present disclosure may achieve a higher continuous capturing speed and video effect.

6. for the auxiliary portable photographing device for use in a mobile phone and the image data collection method disclosed in the present disclosure, the lens optical unit on the one hand adopts the multistage barrel to optimize the imaging effect, and on the other hand, the receiving groove is adopted to achieve the storage of the multistage barrel, the multistage barrel is protected by providing the baffle, and the movement of the baffle as well as the expansion and retraction of the barrel may be achieved by a same step motor.

7. for the auxiliary portable photographing device for use in a mobile phone and the image data collection method disclosed in the present disclosure, a gradually varied arc-shaped design of larger thickness at the right portion may provide a better grip feeling for photographing with the mobile phone, the shutter button provided for the shutter adjusting system makes the focusing of the photographing more convenient, and the provided zoom keys make the function of enlarging and reducing the focal length easier to be operated and accomplished.

8. the auxiliary portable photographing device for use in a mobile phone and the image data collection method disclosed in the present disclosure provide a more convenient solution for adjusting the depth of field of the picture by the aperture size adjusting function provided by the zoom keys.

Symbols of elements: 100—Mobile phone; 110—Interface; 121—First image collection module; 122—First data transmission module; 123—Data storage module; 124—Data processing module; 125—Image display module; 126—First power module; 200—Portable photographing device; 210—Second body; 211—Connector; 212—Latch groove; 213—Insert port; 214—Slide groove; 215—Zoom key; 216—Receiving groove; 221—Second image collection module; 221a—Lens optical unit; 221b—Imaging unit; 221c—Collection controller; 222—Second data transmission module; 222a—AD converter; 222b—Register; 222c—Transmission controller; 223—Second power module; 30—Step motor; 41—Barrel; 43—Screw; 44—Rotating shaft of barrel; 51—Baffle; 52—First pinion; 53—Rotating shaft of baffle; 60—Second pinion.

DETAILED DESCRIPTION OF THE INVENTION

In the following description, specific implementations of the present disclosure will be further described in detail with reference to attached drawings and embodiments thereof. However, these embodiments are used for describing the present disclosure and are not intended to limit the scope of the present disclosure.

Embodiment 1

Figure 1:
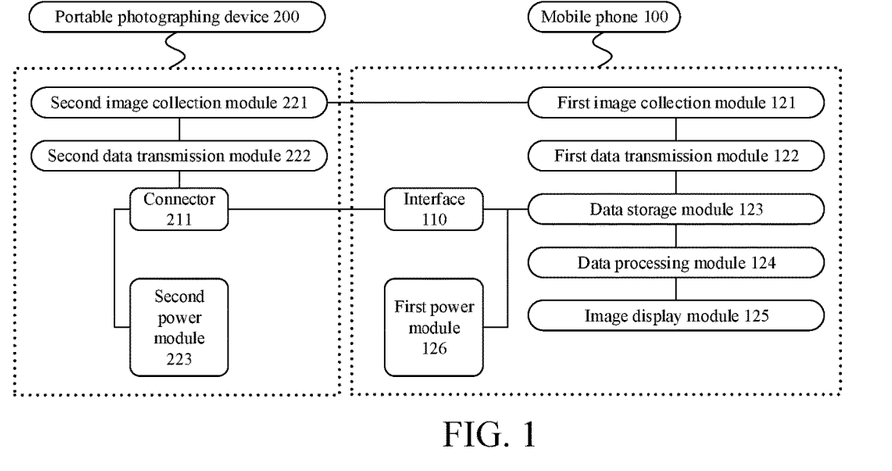
FIG. 1 is a block diagram of illustrative connection between a mobile phone and a portable photographing device according to the present disclosure.

Referring to FIG. 1, an auxiliary portable photographing device for use in a mobile phone is as shown in the figure, a mobile phone 100 comprises a first body and a first functional assembly, the aforesaid first body is provided with an interface 110 configured for signal transmission and power supplying, and the aforesaid first functional assembly comprises a first image collection module 121, a first data transmission module 122, a data storage module 123, a data processing module 124, an image display module 125 and a first power module 126 connected together. A portable photographing device 200 comprises a second body and a second functional assembly, the aforesaid second body is provided with a connector 211 configured for signal transmission and power supplying, and the aforesaid second functional assembly is formed by a second image collection module 221, a second data transmission module 222 and a second power module 223.

It shall be appreciated that, in the embodiment of the present disclosure, the mobile phone 100 and the portable photographing device 200 may also comprise more or less components than what shown in FIG. 1, or have different configurations from what shown in FIG. 1. For example, depending on different functions required, the first functional assembly of the mobile phone 100 may have other configurations, e.g., the first functional assembly may not comprise the aforesaid first image collection module 121 and the first data transmission module 122. In this way, the mobile phone 100 itself does not need the direct image collection function, and the image required is obtained by the portable photographing device 200 connected with the mobile phone 100.

Figure 2:
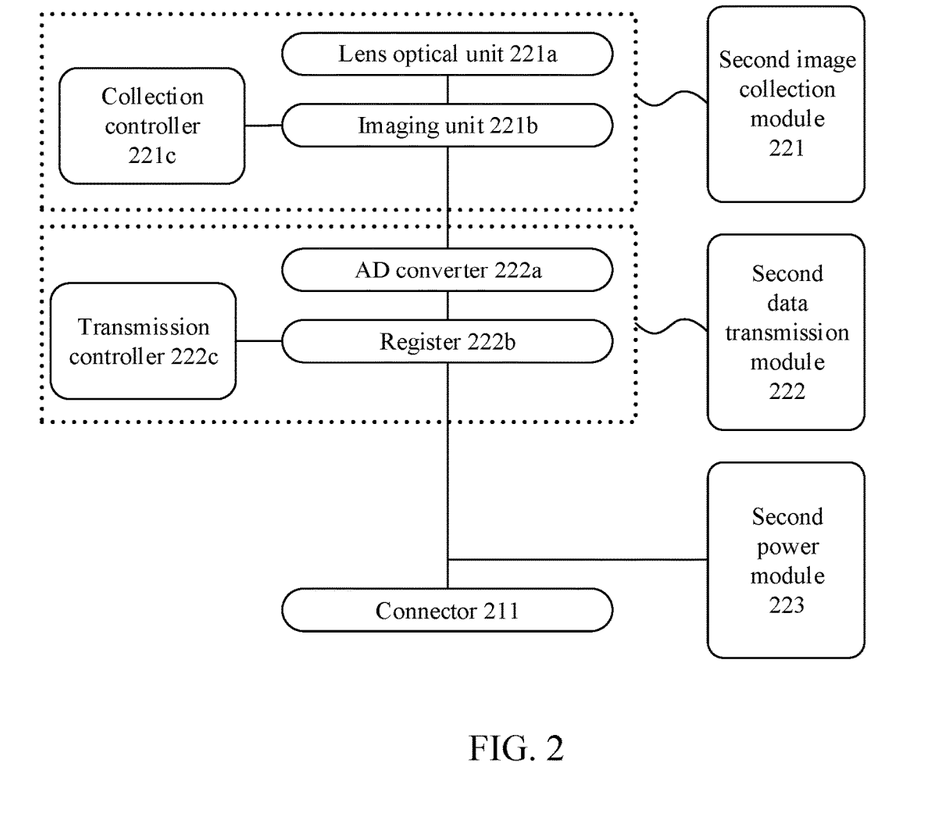
FIG. 2 is a block diagram of illustrative configuration of the portable photographing device according to the present disclosure.

Referring to FIG. 2, the second image collection module 221 comprises a lens optical unit 221a, an imaging unit 221b and a collection controller 221c connected together, the lens optical unit 221a adopts a lens system of a multistage barrel, the imaging unit 221b adopts a content management system (CMOS system), the second data transmission module 222 comprises an AD converter 222a, a register 222b and a transmission controller 222c connected together, the interface 110 is detachably connected with the connector 211 to achieve detachable connection between the register 222b and the data storage module 123 as well as the detachable connection between the first power module 126 and the second power module 223.

Preferably, the interface 110 and the connector 221 form a universal serial bus (USB) connection structure, e.g., a Micro-USB connection structure.

Preferably, the aforesaid lens system adopts a three-stage barrel, and a focal length of the lens of the lens system ranges from 5.4 mm to 30 mm, e.g., from 8 mm to 24 mm.

An imaging size of the aforesaid CMOS system may range from 1 inch to 1/10 inches, e.g., the imaging size is 1/4.6 inches.

The collection controller 221c is mainly constituted by a shutter adjusting system, an auto-focusing system, an aperture adjusting system and a focal-length adjusting system. Preferably, a shutter button and zoom keys 215 are disposed on the second body, the aforesaid shutter adjusting system may be controlled by the shutter button disposed on the aforesaid second body, and the aforesaid auto-focusing system may be controlled by software of the aforesaid first body or controlled by the shutter button disposed on the aforesaid second body. For example, a focusing instruction is issued by half pressing the aforesaid shutter button, a photographing instruction is issued by full pressing the aforesaid shutter button, and the aforesaid aperture adjusting system and the aforesaid focus-length adjusting system may be controlled by the software of the aforesaid first body or controlled by the zoom keys 215 disposed on the aforesaid second body. For example, an enlargement key of the aforesaid zoom keys 215 is adjusted to enlarge the focal length and a reduction key of the aforesaid zoom keys 215 is adjusted to reduce the focal length respectively in a focal-length adjusting mode, and the enlargement key of the aforesaid zoom keys 215 is adjusted to enlarge the aperture and the reduction key of the aforesaid zoom keys 215 is adjusted to reduce the aperture respectively in an aperture adjusting mode.

It shall be appreciated that, the shutter adjusting system and the auto-focusing system may also be controlled in other ways. For example, the photographing instruction may be issued by half pressing the aforesaid shutter button, and the focusing instruction may be issued by full pressing the aforesaid shutter button. As another example, the photographing instruction may be issued by pressing the shutter button for N times, and the focusing instruction may be issued by pressing the shutter button for M times, where N and M are integers not less than 1, and N is not equal to M. The aforesaid aperture adjusting system and the focal-length adjusting system may also be controlled in other ways. For example, volume keys are provided on the second body, and the aperture adjusting system and the focus-length adjusting system may be controlled by the volume keys disposed on the second body. For example, an enlargement key of the volume keys is adjusted to enlarge the focal length and a reduction key of the volume keys is adjusted to reduce the focal length respectively in the focal-length adjusting mode, and the enlargement key of the volume keys is adjusted to enlarge the aperture and the reduction key of the volume keys is adjusted to reduce the aperture respectively in the aperture adjusting mode.

A photographing instruction may be issued via a touch screen of the aforesaid first body or a photographing instruction may be issued via the shutter button of the aforesaid second body. When the photographing instruction is issued via the touch screen of the aforesaid first body, the photographing instruction issued by the aforesaid first body is transmitted, through the USB connection structure formed by the interface 110 and the connector 211, to the second image collection module 221 of the aforesaid second body to accomplish data collection, and then the collected data is transmitted back to the data storage module 123 of the aforesaid first body. When the photographing instruction is issued via the shutter button of the aforesaid second body, the photographing instruction issued by the aforesaid second body is transmitted to the aforesaid second image collection module 221 by the shutter adjusting system of the aforesaid second body to accomplish data collection, and then the collected data is transmitted back to the data storage module 123 of the aforesaid first body.

It shall be appreciated that, the first body and the second body may also issue the photographing instructions in other ways. For example, when a shortcut key for photographing is provided, the first body and the second body may issue the photographing instructions via the shortcut key for photographing.

A focusing instruction issued by the shutter button of the second body and a zooming instruction issued via the zoom keys 215 or the volume keys of the second body may be transmitted to the lens optical unit 221a and the imaging unit 221b of the aforesaid second body by the collection controller 221c of the aforesaid second body to accomplish focusing and zooming, and real-time image data is fed back to the image display module 125 of the aforesaid first body.

Preferably, after the aforesaid first body and the aforesaid second body are connected together, the aforesaid first body has a higher priority, and the instruction issued by the aforesaid first body is adopted by default when the aforesaid first body and the aforesaid second body issue the instructions at the same time. In the case where the first body has the first image collection module 121 and the first data transmission module 122, after the first body and the second body are connected together, the lens optical unit 221a and the imaging unit 221b of the aforesaid second body have a higher priority, and an image collected by the aforesaid second body is adopted by default when the aforesaid first body and the aforesaid second body collect images at the same time. After the aforesaid first body and the aforesaid second body are connected together, if the lens optical unit 221a and the imaging unit 221b of the aforesaid second body are turned off and the aforesaid first body issues an instruction to collect an image, then the image collected by the aforesaid first body is adopted. After the aforesaid first body is separated from the aforesaid second body, if the aforesaid second body issues an instruction, then the image collected by the aforesaid second body is adopted and then temporarily stored in the aforesaid register 222b.

Through the aforesaid design, after the first body and the second body are connected together, the collection instruction issued by the first body will be executed first to ensure that the requirement of the first body is satisfied. For example, if the first body issues an instruction of photographing a picture, and the second body issues an instruction of shooting a video, then the instruction of photographing a picture issued by the first body will be executed first.

In practical use, a user may also define the priority by itself, e.g., the user may set the priority of the portable photographing device 200 to be higher than the priority of the mobile phone 100 if the user mainly performs actions such as picture photographing and video shooting or the like at the side of the portable photographing device 200. In this case, if the first body and the second body issue instructions at the same time, then the collection instruction issued by the portable photographing device 200 will be executed first.

In practical use, the priorities of the portable photographing device 200 and the mobile phone 100 may also be switched automatically. For example, whether the user performs actions at the side of the portable photographing device 200 or the side of the mobile phone 100 is monitored automatically. If the user performs the actions at the side of the portable photographing device 200, then the priority of the portable photographing device 200 is set to be higher than the priority of the mobile phone 100. If the user performs the actions at the side of the mobile phone 100, then the priority of the mobile phone 100 is set to be higher than the priority of the portable photographing device 200. Considering that frequency of using the mobile phone 100 by the user is relatively high, the priority of the mobile phone 100 may be higher than the priority of the portable photographing device 200 by default (the priority of the first body is higher than the priority of the second body by default).

When the first body has the first image collection module 121 and the first data transmission module 122, and the first image collection module 121 of the first body as well as the lens optical unit 221a and the imaging unit 221b of the second body operate normally, the image collected by the second body will be adopted by default after the collection instructions are received, thereby ensuring the image quality. Alternatively, the image collection function of the first body may be turned off by default, the image collected by the second body is adopted first, the instruction of the second body is suppressed by default, and the instruction of the first body is adopted first, thereby providing the simplest operation and the best image quality. When the first body has the first image collection module 121 and the first data transmission module 122, and the lens optical unit 221a and the imaging unit 221b of the second body are turned off, the image collected by the first body will be adopted after the collection instructions are received, thereby ensuring the normal operation of image collection and ensuring the user experience. After the first body is separated from the second body, if the second body issues a collection instruction, then the image collected by the second body is adopted and temporarily stored in the aforesaid register 222b; and if the first body issues the collection instruction and the first body has the first image collection module 121 and the first data transmission module 122, then the image collected by the first body is adopted so that the first body and the second body may be used separately. Preferably, the aforesaid second power module 223 comprises a supercapacitor, and when the aforesaid second power module 223 is equipment with a lithium battery, the supercapacitor is powered by the lithium battery in the aforesaid second power module 223, and the aforesaid lithium battery charges the aforesaid first power module 126 when no photographing is performed; and when the aforesaid second power module 223 is not provided with the lithium battery, the aforesaid supercapacitor is powered by the aforesaid first power module 126, thereby ensuring the reliability of power supplying.

An embodiment of the present disclosure further provides an image data collection method based on an auxiliary portable photographing device for use in a mobile phone, which comprises operations as follows.

During the use, first the interface 110 is connected with the connector 211 to achieve signal and electrical connection between the mobile phone 100 and the portable photographing device 200, the mobile phone 100 issues an instruction to control the lens optical unit 221a and the imaging unit 221b of the portable photographing device 200 to perform image data collection, the collected image data is stored into the register 222b after the analog-digital conversion by the AD converter 222a, the converted image data is transmitted to the data storage module 123 and processed and optimized by the data processing module 124 of the mobile phone 100, and meanwhile, the image data is displayed on the image display module 125, i.e., a display, of the mobile phone 100 and further shared to other objects by software; and collecting, processing, optimizing and sharing functions for the information of pictures of high quality are accomplished simultaneously.

Preferably, the mobile phone 100 and the portable photographing device 200 are detachably connected together in the embodiment of the present disclosure, and such a design not only reduces the volume and the weight of the portable photographing device 200, but also improves the quality of the picture of the mobile phone 100.

For the auxiliary portable photographing device for use in a mobile phone and the image data collection method disclosed in the embodiment of the present disclosure, after the portable photographing device 200 is connected with the mobile phone 100, data storage, processing and displaying are accomplished by the storage system, processing system and the displaying system of the mobile phone 100, and the optimizing and the displaying of the image are accomplished by the software of the mobile phone, which simplifies the data storage and processing system so that the portable photographing device 200 is lighter and more portable as compared to the conventional portable cameras. Moreover, the auxiliary portable photographing device for use in a mobile phone and the image data collection method provide more excellent image data as compared to the camera built in the mobile phone 100, the portable photographing device 200 generates digital image information, the digital image information is stored on the mobile phone 100 via a transmission system, the data is processed and optimized by the mobile phone 100 and meanwhile displayed on a display of the mobile phone 100 to be further shared to other objects by the software; and meanwhile, collecting, processing, optimizing and sharing functions for the information of pictures of high quality are accomplished simultaneously. The present disclosure may achieve upgrading of the mobile phone 100 and the upgrading of the second body respectively. By replacing with a first body of a new mobile phone 100 or replacing with a second body of a new portable photographing device 200, more rapid data processing and optimizing of data and data sharing are achieved, and this not only can provide more excellent image quality, but also can effectively reduce the economical burden of the user.

Embodiment 2

In the embodiments of the present disclosure, the detachable connection between the mobile phone 100 and the portable photographing device 200 may be achieved in many ways. Please refer to FIG. 1 to FIG. 3 for one of the ways for achieving the detachable connection provided by the embodiment of the present disclosure. This embodiment of the present disclosure further provides an auxiliary portable photographing device for use in a mobile phone so that the mobile phone 100 is easy to be detachably connected with the portable photographing device 200, and the realizing structure thereof is as follows.

Figure 3:
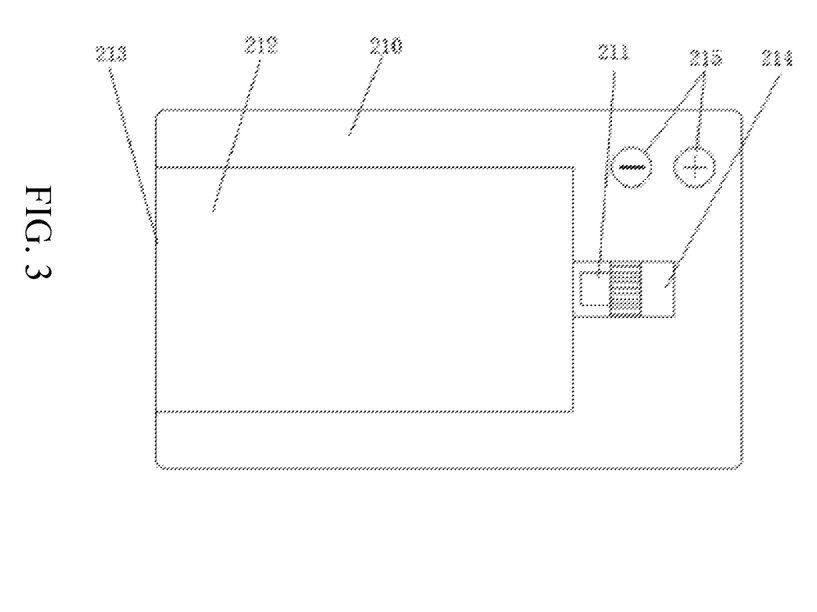
FIG. 3 is a schematic view of an illustrative structure of the portable photographing device according to the present disclosure.

The mobile phone 100 comprises a first body, a first image collection module 121, a first data transmission module 122, a data storage module 123, a data processing module 124, an image display module 125 and a first power module 126, and the aforesaid first body is provided with an interface 110 configured for signal transmission and power supplying. The portable photographing device 200 is formed by a second body 210, a second image collection module 221, a second data transmission module 222 and a second power module 223, the second body 210 is provided with a connector 211 configured for signal transmission and power supplying and a latch groove 212 for detachably connected to the aforesaid first body, one end of the latch groove 212 communicates with an end face of the second body 210 to form an insert port 213 of the aforesaid first body, the connector 211 is disposed at the other end of the latch groove 212 to achieve detachable connection with the interface 110, the interface 110 is detachably connected with the connector 211 to achieve detachable connection between the second data transmission module 222 and the data storage module 123 as well as the detachable connection between the first power module 126 and the second power module 223.

For protection of the connector 211, a slide groove 214 may be disposed at the other end of the latch groove 212, the connector 211 is slidably connected and limited in the slide groove 214, and the connector 211 is capable of being withdrawn to the slide groove 214 or being extended to the latch groove 212 outside the slide groove 214. When the connector 211 is withdrawn to the slide groove 214, the connector 211 is disconnected from the interface 110. When the first body is inserted into the latch groove 212, the connector 211 is extended to the latch groove 212 outside the slide groove 214 so that the connector 211 is connected with the interface 110.

Preferably, the latch groove 212 and the slide groove 214 have a generally C-shaped cross section. Thus, the first body can be reliably fixed and effectively protected within the latch groove 212, and the connector 211 may be reliably fixed and effectively protected within the slide groove 214.

The second image collection module 221 comprises a lens optical unit 221a, an imaging unit 221b and a collection controller 221c, the lens optical unit 221a adopts a lens system of a multistage barrel, the imaging unit 221b adopts a CMOS system, the second data transmission module 222 comprises an AD converter 222a, a register 222b and a transmission controller 222c connected together, the interface 110 is detachably connected with the connector 211 to achieve detachable connection between the register 222b and the data storage module 123.

The interface 110 and the connector 211 form a Micro-USB connection structure.

The aforesaid lens system adopts a three-stage barrel, and a focal length of the lens of the aforesaid lens system ranges from 5.4 mm to 30 mm.

An imaging size of the aforesaid CMOS system ranges from 1 inch to 1/10 inches.

The collection controller 221c is mainly constituted by a shutter adjusting system, an auto-focusing system, an aperture adjusting system and a focal-length adjusting system.

The aforesaid shutter adjusting system is controlled by the shutter button disposed on the aforesaid second body 210, the aforesaid auto-focusing system is controlled by software of the aforesaid first body or controlled by the shutter button disposed on the aforesaid second body 210, a focusing instruction is issued by half pressing the aforesaid shutter button, a photographing instruction is issued by full pressing the aforesaid shutter button, the aforesaid aperture adjusting system and the aforesaid focus-length adjusting system are controlled by the software of the aforesaid first body or controlled by the zoom keys 215 disposed on the second body 210, an enlargement key of the aforesaid zoom keys 215 is adjusted to enlarge the focal length and a reduction key of the aforesaid zoom keys 215 is adjusted to reduce the focal length respectively in a focal-length adjusting mode, and the enlargement key of the aforesaid zoom keys 215 is adjusted to enlarge the aperture and the reduction key of the aforesaid zoom keys 215 is adjusted to reduce the aperture respectively in an aperture adjusting mode.

Preferably, in the case where the first body also has the collection controller, after the aforesaid first body and the aforesaid second body 210 are connected together, the collection controller of the aforesaid first body has a higher priority, and the instruction issued by the aforesaid first body is adopted by default when the aforesaid first body and the aforesaid second body 210 issue the instructions at the same time. After the aforesaid first body and the aforesaid second body 210 are connected together, the lens optical unit 221a and the imaging unit 221b of the aforesaid second body 210 have a higher priority, and an image collected by the aforesaid second body 210 is adopted by default when the aforesaid first body and the aforesaid second body 210 collect images at the same time. After the aforesaid first body and the aforesaid second body 210 are connected together, if the lens optical unit 221a and the imaging unit 221b of the aforesaid second body 210 are turned off and the aforesaid first body issues an instruction, then the image collected by the aforesaid first body is adopted. After the aforesaid first body is separated from the aforesaid second body 210, if the aforesaid second body 210 issues an instruction, then the image collected by the aforesaid second body 210 is adopted and then temporarily stored in the register 222b of the aforesaid second body 210.

The aforesaid second power module 223 comprises a supercapacitor, and when the aforesaid second power module 223 is equipment with a lithium battery, the aforesaid supercapacitor is powered by the aforesaid lithium battery, and the aforesaid lithium battery charges the first power module 126 when no photographing is performed; and when the second power module 223 is not provided with the lithium battery, the aforesaid supercapacitor is powered by the aforesaid first power module 126.

During the use, first the mobile phone 100 is inserted into the latch groove 212 from the insert port 213, the connector 211 is slid in the slide groove 214, and then the interface 110 is connected with the connector 211 to achieve signal and electrical connection between the mobile phone 100 and the portable photographing device 200. The optical lens unit 221a and the imaging unit 221b perform photographing, and a picture obtained by the photographing is stored into the register 222b after the analog-digital conversion by the AD converter 222a, then the converted picture is transmitted to the data storage module 123 and processed and optimized by the data processing module 124 of the mobile phone 100, and meanwhile, the picture is displayed on the image display module 125, i.e., the display, of the mobile phone 100 and further shared to other objects by software; and collecting, processing, optimizing and sharing functions for the information of pictures of high quality are accomplished simultaneously.

The detachable connection between the mobile phone 100 and the portable photographing device 200 not only reduces the volume and the weight of the portable photographing device 200, but also improves the quality of the picture of the mobile phone 100.

The detachable connection between the mobile phone 100 and the portable photographing device 200 may provide a light source of which the light intensity is 5 to 10 times of the flash built in the mobile phone 100 when the flash function of the portable photographing device 200 is activated, thereby providing wider use possibilities for fill-flash function in photographing under strong light and illumination function in photographing under weak light.

The second body 210 has an elastic redundancy so that the second body 210 closely fits with the latch groove 212, and an pressure imposed by the second body 210 on the first body is lower than 2 MPa. Because the second body 210 has an elastic redundancy, the first body can be received in the latch groove 212 due to the elasticity. When the first body is received in the latch groove 212, the first body is securely fixed within the latch groove 212 and will not be easily released from the latch groove 212 due to an elastic restoring force. Because the pressure imposed by the second body 210 on the first body is lower than 2 MPa, no damage will be caused to the first body.

With such a design, the detachable connection between the mobile phone 100 and the portable photographing device 200 can be achieved in the following way: during the use, first the mobile phone 100 is inserted into the latch groove 212 from the insert port 213, the connector 211 is slid in the slide groove 214, and then the interface 110 is connected with the connector 211 to achieve signal and electrical connection between the mobile phone 100 and the portable photographing device 200. The lens optical unit 221a and the imaging unit 221b perform photographing, and a picture obtained by the photographing is stored into the register 222b after the analog-digital conversion by the AD converter 222a, then the converted picture is transmitted to the data storage module 123 and processed and optimized by the data processing module 124 of the mobile phone 100, and meanwhile, the picture is displayed on the image display module 125, i.e., the display, of the mobile phone 100 and further shared to other objects by software; and collecting, processing, optimizing and sharing functions for the information of pictures of high quality are accomplished simultaneously. In the embodiment of the present disclosure, the thickness of the body of the portable photographing device 200 may be 10 mm, the latch groove 212 at the back side may be 5 mm for receiving the mobile phone 100, a lens receiving portion at the front side may be 4.5 mm and may receive a two-stage retractable lens, the focal length is about 3.4 mm to 10 mm; the thickness of the right portion is about 3 cm to provide a better hand-grip feeling, and a gradually varied arc structure is formed between the right end of the second body 210 and a position at ⅓ to the right end. It shall be appreciated that, the aforesaid parameters in the embodiment of the present disclosure may have other options, for example: the thickness of the body of the portable photographing device 200 may be 15 mm, the latch groove 212 at the back side may be 7 mm for receiving the mobile phone 100, a lens receiving portion at the front side may be 7.5 mm and may receive a four-stage retractable lens, the focal length is about 5.4 mm to 30 mm; and the thickness of the right portion is about 3 cm to provide a better hand-grip feeling.

By providing the latch groove 212 and the slide groove 214, the auxiliary portable photographing device for use in a mobile phone disclosed in the embodiment of the present disclosure achieves stable connection of the mobile phone 100 and meanwhile protects the connector 211; by providing the second power module 223, the function of flash exposure may be better achieved to obtain more excellent images under strong light or weak light; and by providing the second image collection module 221 of the second body 210, a higher continuous capturing speed and video effect can be achieved.

Embodiment 3

Part of the components in the embodiment of the present disclosure may be stored to achieve reliable protection of this part of the components. For example, the first body may provide storage for the first functional assembly, and the second body 210 may provide storage for the second image collection module 221 to achieve reliable protection of the first functional assembly and the second image collection module 221. The storage of the components may be achieved in many ways. Please refer to FIG. 1 to FIG. 5 for one of the ways for achieving the storage of the components provided by the embodiment of the present disclosure. This embodiment of the present disclosure further provides an auxiliary portable photographing device for use in a mobile phone, which can achieve reliable storage of the first functional assembly and the second image collection module 221, and the realizing structure thereof is as follows.

The mobile phone 100 comprises a first body and a first functional assembly, the aforesaid first body is provided with a first cavity configured for receiving the aforesaid first functional assembly and an interface 110 configured for signal transmission and power supplying, and the aforesaid first functional assembly comprises a first image collection module 121, a first data transmission module 122, a data storage module 123, a data processing module 124, an image display module 125 and a first power module 126 connected together. The first image collection module 121, the first data transmission module 122, the data storage module 123, the data processing module 124, the image display module 125 and the first power module 126 are received in the aforesaid first cavity to achieve effective protection of the first functional assembly.

Figure 4:
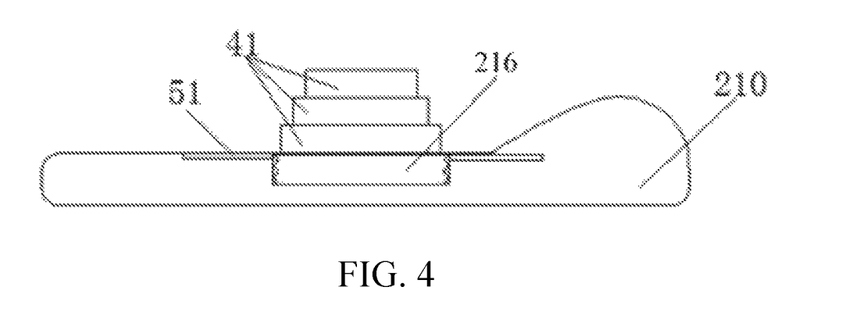
FIG. 4 is another schematic view of an illustrative structure of the portable photographing device according to the present disclosure.
Figure 5:
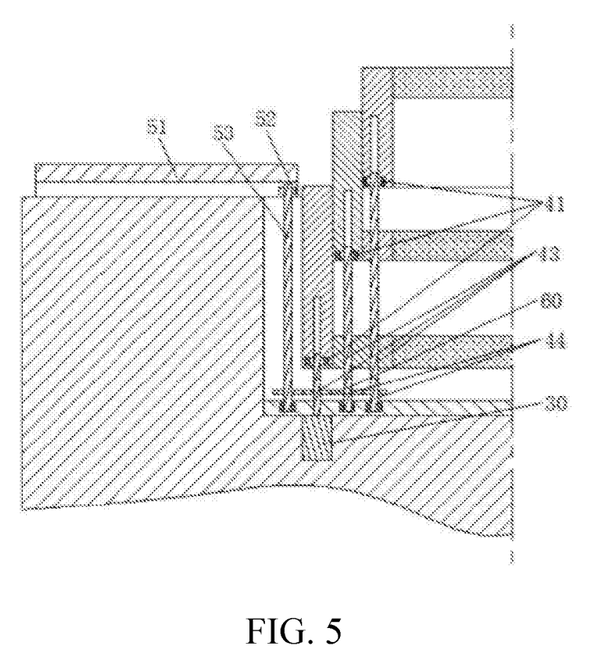
FIG. 5 is a schematic view of an illustrative structure of a lens optical unit of the portable photographing device according to the present disclosure.

The portable photographing device 200 is formed by a second body 210, a second image collection module 221, a second data transmission module 222 and a second power module 223, and the aforesaid second body 210 is provided with a connector 211 configured for signal transmission and power supplying and a receiving groove 216 for mounting the second image collection module 221. The second image collection module 221 comprises a lens optical unit 221a, an imaging unit 221b and a collection controller 221c connected together, the lens optical unit 221a comprises a step motor 30 and a three-stage barrel 41, a barrel wall of each stage of the barrel 41 is moveably connected with screws 43 along the direction of an optical axis via a nut bearing component, and among the three screws 43, one screw 43 is drivingly connected on a driving shaft of the step motor 30, and the other screws 43 are drivingly connected on a rotating shaft 44 of the barrel.

Preferably, an opening of the receiving groove 216 is provided with a baffle 51, the baffle 51 is movably connected on a first pinion 52 via a rack (not shown) in the direction perpendicular to the optical axis, the first pinion 52 is drivingly connected on a rotating shaft 53 of the baffle, and the driving shaft of the step motor 30, the rotating shaft 44 of the barrel and a rotating shaft 53 of the baffle are drivingly connected via a second pinion 60. The imaging effect is optimized by providing the three-stage barrel 41, the storage of the three-stage barrel 41 is achieved by adopting the receiving groove 216, and the protection of the three-stage barrel 41 is achieved by providing the baffle 51.

Preferably, a pinion disposed on the driving shaft of the step motor 30, a pinion disposed on the rotating shaft 44 of the barrel and the pinion disposed on the rotating shaft 53 of the baffle achieve the movement of the baffle 51 as well as the adjustment of the expansion and retraction speed of the barrel 41 via different transmission ratios.

Preferably, the imaging unit 221b adopts a CMOS system, the second data transmission module 222 comprises an AD converter 222a, a register 222b and a transmission controller 222c connected together, the interface 110 is detachably connected with the connector 211 to achieve detachable connection between the register 222b and the data storage module 123 as well as the detachable connection between the first power module 126 and the second power module 223.

The interface 110 and the connector 211 form a USB connection structure, e.g., a Micro-USB connection structure.

A focal length of the lens of the aforesaid lens system adopting the three-stage barrel ranges from 5.4 mm to 30 mm, e.g., from 8 mm to 24 mm. An imaging size of the aforesaid CMOS system ranges from 1 inch to 1/10 inches, e.g., is 1/4.6 inches.

The collection controller 221c is mainly constituted by a shutter adjusting system, an auto-focusing system, an aperture adjusting system and a focal-length adjusting system.

The aforesaid shutter adjusting system is controlled by a shutter button disposed on the second body 210, the aforesaid auto-focusing system is controlled by software of the aforesaid first body or controlled by the shutter button disposed on the aforesaid second body 210, a focusing instruction is issued by half pressing the aforesaid shutter button, a photographing instruction is issued by full pressing the aforesaid shutter button, the aforesaid aperture adjusting system and the aforesaid focus-length adjusting system are controlled by the software of the aforesaid first body or controlled by the zoom keys 215 disposed on the aforesaid second body 210, an enlargement key of the aforesaid zoom keys 215 is adjusted to enlarge the focal length and a reduction key of the aforesaid zoom keys 215 is adjusted to reduce the focal length respectively in a focal-length adjusting mode, and the enlargement key of the aforesaid zoom keys 215 is adjusted to enlarge the aperture and the reduction key of the aforesaid zoom keys 215 is adjusted to reduce the aperture respectively in an aperture adjusting mode.

Preferably, the first body has the collection controller, and after the aforesaid first body and the aforesaid second body 210 are connected together, the collection controller of the aforesaid first body has a higher priority, and the instruction issued by the aforesaid first body is adopted by default when the aforesaid first body and the aforesaid second body 210 issue the instructions at the same time. After the aforesaid first body and the aforesaid second body 210 are connected together, the lens optical unit 221a and the imaging unit 221b of the aforesaid second body 210 have a higher priority, and an image collected by the aforesaid second body 210 is adopted by default when the aforesaid first body and the aforesaid second body 210 collect images at the same time. After the aforesaid first body and the aforesaid second body 210 are connected together, if the lens optical unit 221a and the imaging unit 221b of the aforesaid second body 210 are turned off and the aforesaid first body issues an instruction, then the image collected by the aforesaid first body is adopted. After the aforesaid first body is separated from the aforesaid second body 210, if the aforesaid second body 210 issues an instruction, then the image collected by the aforesaid second body 210 is adopted and then temporarily stored in the register 222b of the aforesaid second body 210.

During the use, first the interface 110 is connected with the connector 211 to achieve signal and electrical connection between the mobile phone 100 and the portable photographing device 200. The optical lens unit 221a and the imaging unit 221b perform photographing, and a picture obtained by the photographing is stored into the register 222b after the analog-digital conversion by the AD converter 222a, then the converted picture is transmitted to the data storage module 123 and processed and optimized by the data processing module 124 of the mobile phone 100, and meanwhile, the picture is displayed on the image display module 125, i.e., the display, of the mobile phone 100 and further shared to other objects by software; and collecting, processing, optimizing and sharing functions for the information of pictures of high quality are accomplished simultaneously.

The detachable connection between the mobile phone 100 and the portable photographing device 200 not only reduces the volume and the weight of the portable photographing device 200, but also improves the quality of the picture of the mobile phone 100.

In the embodiment of the present disclosure, the thickness of the body of the portable photographing device 200 may be 10 mm, the latch groove 212 at the back side may be 5 mm for receiving the mobile phone 100, a lens receiving portion at the front side may be 4.5 mm and may receive a two-stage retractable lens, the focal length is about 3.4 mm to 10 mm; the thickness of the right portion is about 3 cm to provide a better hand-grip feeling, and a gradually varied arc structure is formed between the right end of the second body 210 and a position at ⅓ to the right end. It shall be appreciated that, the aforesaid parameters in the embodiment of the present disclosure may have other options, for example: the thickness of the body of the portable photographing device 200 may be 15 mm, the latch groove 212 at the back side may be 7 mm for receiving the mobile phone 100, a lens receiving portion at the front side may be 7.5 mm and may receive a four-stage retractable lens, the focal length is about 5.4 mm to 30 mm; and the thickness of the right portion is about 3 cm to provide a better hand-grip feeling.

For the auxiliary portable photographing device for use in a mobile phone disclosed in the embodiment of the present disclosure, the lens optical unit 221a on the one hand adopts the multistage barrel to optimize the imaging effect, and on the other hand, the receiving groove 216 is adopted to achieve the storage of the multistage barrel, the multistage barrel is protected by providing the baffle 51, and the movement of the baffle 51 as well as the expansion and retraction of the barrel 41 may be achieved by a same step motor 30. With the gradually varied arc-shaped design of larger thickness at the right portion, a better grip feeling for photographing with the mobile phone 100 may be provided, the shutter button provided for the shutter adjusting system makes the focusing of the photographing more convenient, and the provided zoom keys 215 make the function of enlarging and reducing the focal length easier to be operated and accomplished. By the aperture size adjusting function provided by the zoom keys 215, a more convenient solution is provided for adjusting the depth of field of the picture.

What described above are the embodiments of the present disclosure, and those skilled in the art can implement or use the present disclosure based on the aforesaid description of the disclosed embodiments. Various modifications of these embodiments shall be apparent to those of ordinary skill in the art, and the general principle defined in the present disclosure may be achieved in other embodiments without departing from the spirit or scope of the present disclosure. Therefore, the present disclosure will not be limited to these embodiments shown herein but conform to the broadest scope that is consistent with the principle and novel features disclosed herein.

INDUSTRIAL APPLICABILITY

For the auxiliary portable photographing device for use in a mobile phone and the image data collection method disclosed in the present disclosure, after the portable photographing device is connected with the mobile phone, data storage, processing and displaying are accomplished by the storage system, processing system and the displaying system of the mobile phone, and the optimizing and the displaying of the image are accomplished by the software of the mobile phone, which simplifies the data storage and processing system so that the portable photographing device is lighter and more portable as compared to the conventional portable cameras. Moreover, the auxiliary portable photographing device for use in a mobile phone and the image data collection method provide more excellent image data as compared to the camera built in the mobile phone, the portable photographing device generates digital image information, the digital image information is stored on the mobile phone via a transmission system, the data is processed and optimized by the mobile phone and meanwhile disposed on a display of the mobile phone to be further shared to other objects by the software; and meanwhile, collecting, processing, optimizing and sharing functions for the information of pictures of high quality are accomplished simultaneously. The auxiliary portable photographing device for use in a mobile phone and the image data collection method disclosed in the present disclosure may achieve upgrading of the mobile phone and the upgrading of the second body respectively. By replacing with a first body of a new mobile phone or replacing with a second body of a new portable photographing device, more rapid data processing and optimizing of data and data sharing are achieved, and this not only can provide more excellent image quality, but also can effectively reduce the economical burden of the user.

By providing the latch groove and the slide groove, the auxiliary portable photographing device for use in a mobile phone and the image data collection method disclosed in the present disclosure achieve stable connection of the mobile phone, and meanwhile protect the connector. By providing the second power module, the function of flash exposure can be better achieved to obtain more excellent images under strong light or weak light. By the image collection module of the second body, a higher continuous capturing speed and video effect cam be achieved.

For the auxiliary portable photographing device for use in a mobile phone and the image data collection method disclosed in the present disclosure, the lens optical unit on the one hand adopts the multistage barrel to optimize the imaging effect, and on the other hand, the receiving groove is adopted to achieve the storage of the multistage barrel, the multistage barrel is protected by providing the baffle, and the movement of the baffle as well as the expansion and retraction of the barrel may be achieved by a same step motor. With the gradually varied arc-shaped design of larger thickness at the right portion, a better grip feeling for photographing with the mobile phone may be provided, the shutter button provided for the shutter adjusting system makes the focusing of the photographing more convenient, and the provided zoom keys make the function of enlarging and reducing the focal length easier to be operated and accomplished. By the aperture size adjusting function provided by the zoom keys, a more convenient solution is provided for adjusting the depth of field of the picture.

What is claimed is:

1. An auxiliary portable photographing device for use in a mobile phone, the mobile phone comprising a first body, a data storage module, a data processing module, an image display module and a first power module, the first body being provided with an interface configured for signal transmission and power supplying, the auxiliary portable photographing device for use in a mobile phone being characterized in that, the portable photographing device comprising a second body, an image collection module, a data transmission module, and a second power module, the second body being provided with a connector configured for signal transmission and power supplying, the image collection module comprising a lens optical unit, an imaging unit and a collection controller connected together, the lens optical unit adopting a lens system of a multistage barrel, the imaging unit adopting a CMOS system, the data transmission module comprising an AD converter, a register and a transmission controller connected together, the interface being detachably connected with the connector to achieve detachable connection between the register and the data storage module as well as the detachable connection between the first power module and the second power module, wherein the collection controller is mainly constituted by a shutter adjusting system, an auto-focusing system, an aperture adjusting system and a focal-length adjusting system;

wherein a shutter button and zoom keys are disposed on the second body, the shutter adjusting system is controlled by the shutter button disposed on the second body, the auto-focusing system is controlled by software of the first body or controlled by the shutter button disposed on the second body, a focusing instruction is issued by half pressing the shutter button, a photographing instruction is issued by full pressing the shutter button, the aperture adjusting system and the focus-length adjusting system are controlled by the software of the first body or controlled by the zoom keys disposed on the second body, an enlargement key of the zoom keys is adjusted to enlarge the focal length and a reduction key of the zoom keys is adjusted to reduce the focal length respectively in a focal-length adjusting mode, and the enlargement key of the zoom keys is adjusted to enlarge the aperture and the reduction key of the zoom keys is adjusted to reduce the aperture respectively in an aperture adjusting mode;

wherein after the first body and the second body are connected together, the instruction issued by the first body has a higher priority, the instruction issued by the first body is adopted by default when the first body and the second body issue the instructions at the same time; after the first body and the second body are connected together, the lens optical unit and the imaging unit of the second body have a higher priority, an image collected by the second body is adopted by default when the first body and the second body collect images at the same time; after the first body and the second body are connected together, if the lens optical unit and the imaging unit of the second body are turned off and the first body issues an instruction, then the image collected by the first body is adopted; after the first body is separated from the second body, if the second body issues an instruction, then the image collected by the second body is adopted and temporarily stored in the register.

2. The auxiliary portable photographing device for use in a mobile phone of claim 1, being characterized in that, the interface and the connector form a USB connection structure.

3. The auxiliary portable photographing device for use in a mobile phone of claim 1, being characterized in that, the lens system adopts a three-stage barrel, and a focal length of the lens of the lens system ranges from 5.4 mm to 30 mm.

4. The auxiliary portable photographing device for use in a mobile phone of claim 1, being characterized in that, an imaging size of the CMOS system ranges from 1 inch to $\frac{1}{10}$ inches.

5. The auxiliary portable photographing device for use in a mobile phone of claim 1, being characterized in that, a photographing instruction is issued via a touch screen of the first body or a photographing instruction is issued via the shutter button of the second body, the photographing instruction issued by the first body is transmitted, through the USB connection structure formed by the interface and the connector, to the image collection module of the second body to accomplish data collection via the image collection module of the second body, and then the collected data is transmitted back to the data storage module of the first body; the photographing instruction issued by the shutter button of the second body is transmitted to the image collection module by the shutter adjusting system of the second body to accomplish data collection via the image collection module of the second body, and then the collected data is transmitted back to the data storage module of the first body.

6. The auxiliary portable photographing device for use in a mobile phone of claim 1, being characterized in that, a focusing instruction and a zooming instruction are issued respectively via the shutter button and the zoom keys of the second body and transmitted to the lens optical unit and the imaging unit of the second body by the collection controller of the second body to accomplish focusing and zooming, and real-time image data is fed back to the image display module of the first body.

7. The auxiliary portable photographing device for use in a mobile phone of claim 1, being characterized in that, the second power module comprises a supercapacitor, and when the second power module is equipment with a lithium battery, the supercapacitor is powered by the lithium battery, and the lithium battery charges the first power module when no photographing is performed; and when the second power module is not provided with the lithium battery, the supercapacitor is powered by the first power module.

8. The auxiliary portable photographing device for use in a mobile phone of claim 1, wherein the second body is provided with a connector configured for signal transmission and power supplying and a latch groove for detachably connected to the first body, one end of the latch groove communicating with an end face of the second body to form an insert port of the first body, the connector being disposed at the other end of the latch groove to achieve detachable connection with the interface.

9. The auxiliary portable photographing device for use in a mobile phone of claim 8, being characterized in that, a slide groove is disposed at the other end of the latch groove, the connector is slidably connected and limited in the slide groove, and the connector is capable of being withdrawn to the slide groove or being extended to the latch groove outside the slide groove.

10. The auxiliary portable photographing device for use in a mobile phone of claim 8, being characterized in that, an elastic redundancy is set for the second body, the second body closely fits with the latch groove, and an pressure imposed by the second body on the first body is lower than 2 MPa.

11. The auxiliary portable photographing device for use in a mobile phone of claim 9, being characterized in that, cross sections of the latch groove and the slide groove have a are generally C-shaped cross section.

12. The auxiliary portable photographing device for use in a mobile phone of claim 8, being characterized in that, the thickness of a right-end hand-held portion of the second body is 2 to 3 times of the thickness of the left end thereof, and a gradually varied arc structure is formed between the right end of the second body and a position at ⅓ to the right end.

13. An auxiliary portable photographing device for use in a mobile phone, the mobile phone comprising a first body, a data storage module, a data processing module, an image display module and a first power module, the first body being provided with an interface configured for signal transmission and power supplying, the auxiliary portable photographing device for use in a mobile phone being characterized in that, the auxiliary portable photographing device for use in a mobile phone being formed by a second body, an image collection module, a data transmission module, and a second power module, the second body being provided with a connector configured for signal transmission and power supplying and a receiving groove configured for mounting the image collection module, the image collection module comprising a lens optical unit, an imaging unit and a collection controller, the lens optical unit comprising a step motor and a multistage barrel, a barrel wall of the multistage barrel being moveably connected with multiple screws along the direction of an optical axis via a nut bearing component, and among the multiple screws, one screw being drivingly connected on a driving shaft of the step motor, and the other screws being drivingly connected on a rotating shaft of the barrel, an opening of the receiving groove being provided with a baffle, the baffle being movably connected on a pinion via a rack in the direction perpendicular to the optical axis, the pinion being drivingly connected on a rotating shaft of the baffle, the driving shaft of the step motor, the rotating shaft of the barrel and the rotating shaft of the baffle being drivingly connected via a pinion, the interface being detachably connected with the connector to achieve detachable connection between the data transmission module and the data storage module as well as the detachable connection between the first power module and the second power module.

14. The auxiliary portable photographing device for use in a mobile phone of claim 13, being characterized in that, a pinion disposed on the driving shaft of the step motor, a pinion disposed on the rotating shaft of the barrel and the pinion disposed on the rotating shaft of the baffle achieve the movement of the baffle as well as the adjustment of the expansion and retraction speed of the barrel through different transmission ratios, and the energy required by the operation of the step motor is provided by the second power module.

15. An auxiliary portable photographing device for use in a mobile phone, the mobile phone comprising a first body, a data storage module, a data processing module, an image display module and a first power module, the first body being provided with an interface configured for signal transmission and power supplying, the auxiliary portable photographing device for use in a mobile phone being characterized in that, the auxiliary portable photographing device for use in a mobile phone being formed by a second body, an image collection module, a data transmission module, and a second power module, the second body being provided with a connector configured for signal transmission and power supplying, the image collection module comprising a lens optical unit, an imaging unit and a collection controller, the lens optical unit comprising a step motor and a multistage barrel, a barrel wall of the multistage barrel being moveably connected with multiple screws along the direction of an optical axis via a nut bearing component, and among the multiple screws, one screw being drivingly connected on a driving shaft of the step motor, and the other screws being drivingly connected on a rotating shaft of the barrel, the interface being detachably connected with the connector to achieve detachable connection between the data transmission module and the data storage module as well as the detachable connection between the first power module and the second power module, wherein the second body is further provided with a receiving groove configured for mounting the image collection module, an opening of the receiving groove is provided with a baffle, the baffle is movably connected on a pinion via a rack in the direction perpendicular to the optical axis, the pinion is drivingly connected on a rotating shaft of the baffle, and the driving shaft of the step motor, the rotating shaft of the barrel and the rotating shaft of the baffle are drivingly connected via the pinion.

16. An image data collection method, being applicable to the auxiliary portable photographing device for use in a mobile phone of claim 1, being characterized in that, the image data collection method comprising:
  connecting an interface with a connector to achieve signal and electrical connection between the mobile phone and the portable photographing device;
  issuing an instruction by the mobile phone to control a lens optical unit and an imaging unit of the portable photographing device to perform image data collection;
  performing analog-digital conversion by an AD converter on the collected image data and storing the converted image data into a register, and then transmitting the image data into a data storage module; and
  processing and optimizing the image data in the data storage module by a data processing module of the mobile phone, and displaying the image data on the image display module of the mobile phone.

17. The image data collection method of claim 16, being characterized in that, the method further comprises:
  a first body having a higher priority, and adopting an instruction issued by the first body by default when the first body and the second body issue instructions at the same time; and
  the lens optical unit and the imaging unit of the second body having a higher priority, and adopting an image collected by the second body by default when the first body and the second body collect images at the same time.

* * * * *